United States Patent [19]

Hohne et al.

[11] 4,105,332
[45] Aug. 8, 1978

[54] APPARATUS FOR PRODUCING A LIGHT BEAM HAVING A UNIFORM PHASE FRONT AND DISTANCE MEASURING APPARATUS

[75] Inventors: Walter Hohne, Lewisburg; Robin H. Hines, Tullahoma, both of Tenn.

[73] Assignee: Precision International, Inc., Tullahoma, Tenn.

[21] Appl. No.: 777,441

[22] Filed: Mar. 14, 1977

[51] Int. Cl.$^2$ ............................ G01C 3/08; G02B 5/14
[52] U.S. Cl. ........................................ 356/5; 250/552; 350/96.28; 350/96.15
[58] Field of Search ............... 356/4, 5; 350/96 C, 350/96 T; 250/552

[56] References Cited

U.S. PATENT DOCUMENTS

| 3,600,568 | 8/1971 | Weyrauch | 350/96 B |
| 3,604,802 | 9/1971 | Ohmori et al. | 356/4 |
| 3,619,058 | 11/1971 | Hewlett et al. | 356/5 |
| 3,691,390 | 9/1972 | Chow et al. | 250/553 |
| 3,759,616 | 9/1973 | Hildebrand | 356/4 |
| 3,832,028 | 8/1974 | Kapron | 350/96 C |
| 3,902,803 | 9/1975 | Lego, Jr. | 356/5 |

OTHER PUBLICATIONS

Chen et al; Applied Optics, vol. 2, No. 3, Mar. 1963, pp. 265–271.

Primary Examiner—S. C. Buczinski
Attorney, Agent, or Firm—Cushman, Darby & Cushman

[57] ABSTRACT

An apparatus including a frusto-conically shaped tube for transmitting light with internal reflection surfaces which diverge in the direction from input to output. Incident light from an LED or other substantially phase coherent source is mixed by internal reflection of rays incident at greater than a predetermined angle to minimize the non-uniform phase front and concentrate the beam to permit greater transmitted power. The apparatus finds particular utility in distance measuring instruments in which the output of the tube is directed to an object and the phase of the reflected light compared with the phase of the transmitted light to determine the distance.

7 Claims, 2 Drawing Figures

APPARATUS FOR PRODUCING A LIGHT BEAM HAVING A UNIFORM PHASE FRONT AND DISTANCE MEASURING APPARATUS

SUMMARY OF THE PRIOR ART AND BACKGROUND OF THE INVENTION

The invention relates to an optical apparatus for producing a light beam having a substantially uniform phase front which finds particular utility in electro-optical distance measuring devices.

In recent years, distance measuring instruments have been developed and are available commercially which utilize the measurements and phase of a beam of modulated light to determine the distance between the instrument and some reference object. In such devices, a beam of coherent light, e.g., from an LED, is modulated at some convenient frequency and directed to the object which is to be measured. The phase relation between the transmitted and received light is a measure of the distance from the instrument to the target and can be determined by converting the received signals to electrical signals in a photodiode or the like and using conventional electronic circuits to ascertain and display the phase difference between the respective signals. Such devices are described in greater detail, e.g., in an article by Robin H. Hines, one of the inventors of the present application, entitled, "A Geodic and Survey Infra Red Distance Measurement Instrument", which appeared in SPIE, vol. 95, *Modern Utilization of Infra Red Technology II* (1976), pp. 204–205.

Since the phase between the received and reflected light is used to calculate the distance, it is obvious that any variation in uniformity in the transmitted phase front will result in inaccuracies in measurement. Accordingly, it is desirable in this application and in other applications that require a precise modulated light phase measurement to minimize the error in the phase front. When a light emitting diode is modulated at a frequency in the hundreds of KHz through the tens of MHz range, or when a continuous-wave laser is electro-optically modulated in a similar frequency range, the output beam does not have a radially uniform phase front. This non-uniformity can probably be attributed to contaminants in the semi-conductor process causing non-uniform transit time within the LED, and due to harmonics and resonances, established in the electro-optical crystal with the laser modulation. Also, the intensity of the light may vary radially in extreme cases and exhibit light hotspots. In any case, the degree of homogeneity of the LED output beam is a function of the manufacturing techniques and materials and is beyond the control of the user.

In addition to the non-uniform phase front, the radiant power emitted by typical LEDs is distributed over large angles with respect to the axis of the device.

Since the effective range of the instrument is a function of the divergence of the generated light beam 5 and the emitted power $P_E$, $$P_T \sim \frac{P_{E(1-\cos\theta)}}{\phi^2}$$

wherein:

$P_T$ = Transmitted Power,
$\theta$ = The Half Angle Collection Cone, and $$\phi = \frac{\text{Spot Size of Emitting Surface}}{\text{Focal Length of Lens}},$$

and for most electro-optical distance measuring devices, the trade-off between the transmit lens diameter and the focal length is such that the half angle is typically from 2 to 6°, only a small portion of the energy is within that small half angle.

The present invention relates to a simple and passive optical device which finds particular utility in conjunction with electro-optical measuring devices and other similar apparatus in which it is desirable to produce a uniform phase front. This is accomplished by an optical transmitting tube which has internal reflecting surfaces which diverge, i.e., taper, from each other in the direction from input to output. Light entering the taper, e.g., from an LED, at greater than a predetermined angle, e.g., 4°, is internally reflected, bouncing off the internal reflecting surfaces. This internal reflection both mixes the emitted energy to minimize the non-uniform phase front and also concentrates the energy into a narrow beam to permit greater transmitted power. Since the walls are tapered, the original path of each reflected ray is altered to a path more nearly parallel to the axis and, therefore, energy which would not ordinarily be transmitted due to the small half angle is now concentrated within that half angle. Additional concentration can be attained by placing a lens between the optical taper and the LED with the entry end of the tapered tube located at the best focus for the LED.

Other objects and purposes of the invention will be clear from the following detailed description of the drawings.

DETAILED DESCRIPTION OF THE DRAWINGS

Figure 1:
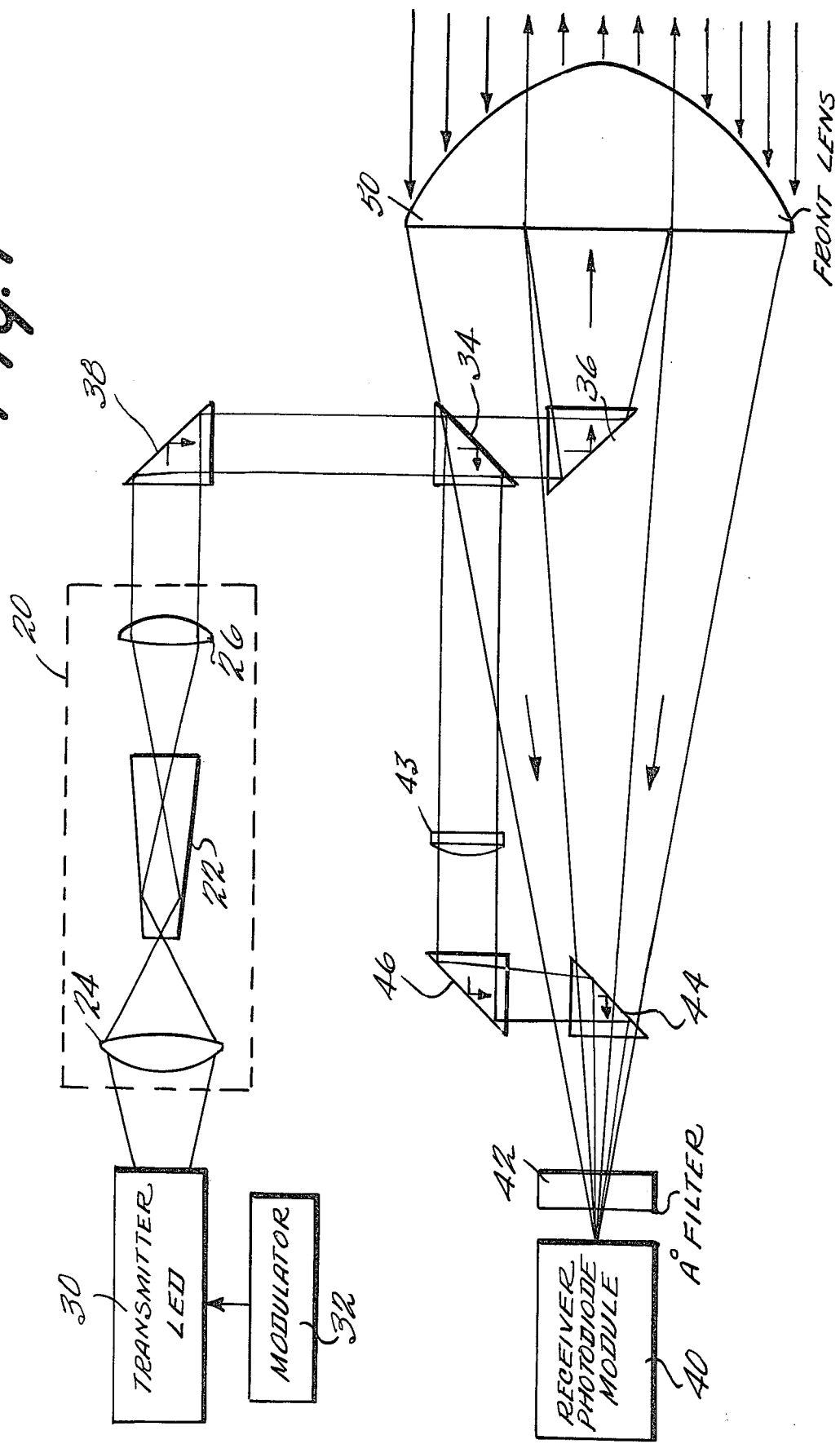
FIG. 1 shows a distance measuring instrument including the novel apparatus of the present invention.

Reference is now made to FIG. 1 which shows one embodiment of a distance measuring apparatus incorporating the unique structure of the present invention comprising an apparatus 20 which is made up of a frusto-conically shaped tube 22 having diverging internal light reflecting surfaces, a condensing lens 24 and a collimating lens 26. A 1.00 diameter collimating lens 7 inches from the tube exit has proved satisfactory. The remainder of the structure illustrated in FIG. 1, other than the apparatus 20, is conventional and is described in the article discussed briefly above.

Figure 2:
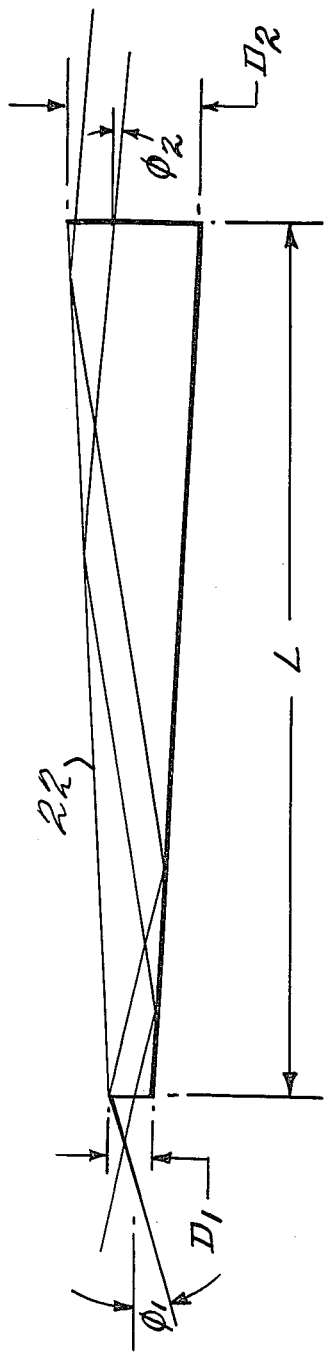
FIG. 2 shows a detailed view of the light emitting tube of the present invention showing the manner in which light beams entering at greater than a given angle are reflected by the diverging internal reflection surface of the tube.

A conventional transmitter LED 30 is modulated by a conventional modulator 32 to produce a light beam which is directed to condensing lens 24 which is preferably disposed at the best focus of LED 30. The light emitted from the lens 24 is directed to tube 22 which is shown enlarged in FIG. 2. Referring to FIG. 2, tube 22 receives light over about a 50° solid angle, with much of the light being internally reflected as indicated by the arrows in FIG. 2. For a tube 0.200 inches long, those rays below 4° pass straight through, while rays between 4° and 8° strike the edge of the reflecting surface once and exit at half the angle they enter. Those rays between 8° and 12° strike the edge twice with the angle halved at each bounce. Rays above 12° do not exit. The following table gives typical relationships between light entry angle, mix ratio, power increase, and exit angle for two sets of dimensions of tube 22. The precise values will vary depending on the LED used.

| $D_1$ | $D_2$ | L | Entry Angle | Mix Ratio | Power Increase | Exit Angle |
|---|---|---|---|---|---|---|
| .008 * | .016 * | .100 * | ~13° | 11 | 8.5 | 4.3° |
| .008 * | .016 * | .200 * | ~8.8° | 50 | 4.3 | 4.3° |

* inches (typically)

Any suitable material can be used for tube 22 and both solid glass tapered tubes and hollow tapered tubes have been successfully employed. The glass gives power level increases closer to the theoretical than do hollow tapered tubes, but tends to be more difficult to mount and to fabricate. An electro-formed nickel tube clad with gold having a lip at the entrance aperture so that the unit can be mounted directly on the LED or a lens-type mount with a laser has been found to be particularly satisfactory. The components of apparatus 20 can be mounted together in any suitable way.

Referring again to FIG. 1, the light leaving collimating lens 26 is directed to an internal prism 34 and to an external prism 36 via prism 38. The light from prism 34 is directed to the conventional receiver photodiode module 40 via filter 42, lens 43 and prisms 44 and 46. Prism 36 directs a portion of the light from prism 38 through a front lens 50 and the light returning from the object whose distance is to be measured is received by lens 50 and similarly directed to module 40 via filter 42 to produce electrical signals. The phase between signals is determined and conventionally displayed as the distance measured.

Many changes and modifications in the above-described embodiments of the invention can, of course, be carried out without departing from the scope thereof. Accordingly, that scope is intended to be limited only by the scope of the appended claims.

What is claimed is:

1. An apparatus for measuring the distance between the apparatus and a remote target comprising:
   a source of light;
   an optical transmitting system including a tube for receiving at an input light from said diode within a given solid angle and an output, said tube having internal light reflecting surfaces which diverge from each other in the direction from input to output so that light entering at greater than a predetermined angle is reflected from said surfaces to minimize the non-uniform phase front, and increase the power;
   means for modulating the light emitted from said diode;
   photosensitive means for producing an electrical signal in response to incident light;
   means for directing light from said tube to said target and directly to said photosensitive means and for directing light reflected from said target to said photosensitive means; and
   means for determining said distance by comparing the phase of the signals produced by said photosensitive means.

2. A system as in claim 1, wherein said directing means includes a plurality of prisms and a front lens.

3. An apparatus as in claim 1, wherein said source is an LED.

4. An apparatus as in claim 1, wherein said system further includes a condensing lens between said source and tube and a collimating lens for collimating the light from said output.

5. An apparatus as in claim 1, wherein said tube is an electro-formed nickel tube clad with gold.

6. An apparatus as in claim 1, wherein said tube is 0.1 inches in length, and has an input diameter of 0.008 inches and an output diameter of 0.016 inches.

7. An apparatus as in claim 1, and wherein said tube is 0.02 inches in length and has an input diameter of 0.008 inches and an output diameter of 0.016 inches.

* * * * *